United States Patent
Kim et al.

(10) Patent No.: US 9,547,790 B2
(45) Date of Patent: Jan. 17, 2017

(54) METHOD AND APPARATUS FOR PROCESSING IMAGES

(71) Applicant: Samsung Electronics Co., Ltd., Suwon-si, Gyeonggi-do (KR)

(72) Inventors: Wonjun Kim, Hwaseong-si (KR); Sungjoo Suh, Seoul (KR); Jaejoon Han, Seoul (KR)

(73) Assignee: SAMSUNG ELECTRONICS CO., LTD., Gyeonigg-do (KR)

( * ) Notice: Subject to any disclaimer, the term of this patent is extended or adjusted under 35 U.S.C. 154(b) by 0 days.

(21) Appl. No.: 14/641,787

(22) Filed: Mar. 9, 2015

(65) Prior Publication Data

US 2015/0269417 A1    Sep. 24, 2015

(30) Foreign Application Priority Data

Mar. 19, 2014 (KR) .......... 10-2014-0032239

(51) Int. Cl.
| | | |
|---|---|---|
| *G06K 9/00* | (2006.01) | |
| *G06K 9/46* | (2006.01) | |
| *G06K 9/62* | (2006.01) | |

(52) U.S. Cl.
CPC ......... *G06K 9/00275* (2013.01); *G06K 9/4642* (2013.01); *G06K 9/6232* (2013.01)

(58) Field of Classification Search
None
See application file for complete search history.

(56) References Cited

U.S. PATENT DOCUMENTS

| | | |
|---|---|---|
| 7,263,241 B2 | 8/2007 | Huang et al. |
| 8,055,018 B2 | 11/2011 | Han et al. |
| 8,600,102 B1 | 12/2013 | Frome |

FOREIGN PATENT DOCUMENTS

| | | |
|---|---|---|
| JP | 1997-167216 | 6/1997 |
| KR | 10-0287216 B1 | 1/2001 |
| KR | 10-2005-0112219 A | 11/2005 |
| KR | 10-0596559 B1 | 7/2006 |
| KR | 10-0690295 B1 | 2/2007 |
| KR | 10-0819027 B1 | 4/2008 |
| KR | 10-0904916 B1 | 7/2009 |
| KR | 10-2009-0093797 | 9/2009 |
| KR | 10-2010-0066977 A | 6/2010 |
| KR | 10-1314293 B1 | 10/2013 |

OTHER PUBLICATIONS

Leng et al., "Dynamic weighted discrimination power analysis: a novel approach for face and palmprint recognition in DCT domain", International Journal of the Physical Sciences vol. 5(17), pp. 2543-2554, Dec. 2010.*

(Continued)

*Primary Examiner* — Soo Park
(74) *Attorney, Agent, or Firm* — Harness, Dickey & Pierce, P.L.C.

(57) ABSTRACT

A method and apparatus for processing an image is disclosed, wherein the apparatus for processing the image may set blocks in an input image, perform an orthogonal transform on pixel values in the blocks, obtain orthogonal transform coefficients, and generate a resulting image by normalizing the obtained orthogonal transform coefficients.

20 Claims, 6 Drawing Sheets

(56) References Cited

OTHER PUBLICATIONS

Chen et al., "Illumination compensation and normalization for robust face recognition using discrete cosine transform in logarithm domain", IEEE Transactions on Systems, Man, and Cybernetics—part B, vol. 36, No. 2, Apr. 2006.*

Ruiz-del-Solar et al., "Illumination compensation and normalization in eigenspace-based face recognition: a comparative study of different pre-processing approaches", Pattern Recognition Letters, vol. 29, issue 14, Oct. 2008.*

Vishwakarma et al., "A novel approach for face recognition using DCT coefficients re-scaling for illumination normalization", 15th International Conference on Advanced Computing and Communications, 2007.*

Ekenel et al., "Analysis of local appearance-based face recognition: effects of feature selection and feature normalization", CVPRW 2006.*

Shin et al., "Directionally classified eigenblocks for localized feature analysis in face recognition", Optical Engineering 45(7), 077202 Jul. 2006.*

T. Zhang, "Face Recognition Under Varying Illumination Using Gradientfaces", IEEE Transactions on Image Processing, vol. 18, No. 11, Nov. 2009, 8pgs.

B. Wang, "Illumination Normalization Based on Weber's Law With Application to Face Recognition", IEEE Signal Processing Letters, vol. 18, No. 8, Aug. 2011, 4pgs.

* cited by examiner

METHOD AND APPARATUS FOR PROCESSING IMAGES

CROSS-REFERENCE TO RELATED APPLICATION

This application claims the priority benefit of Korean Patent Application No. 10-2014-0032239, filed on Mar. 19, 2014, in the Korean Intellectual Property Office, the entire disclosure of which is incorporated herein by reference.

BACKGROUND

1. Field

At least some example embodiments of the following description relate to a method of processing an image based on an orthogonal transform.

2. Description of the Related Art

In recent times, developments in smart phone technology has led to growth in authentication applications implemented using a face of a user for authentication. However, authentication using the user face is highly susceptible to complex illumination conditions indoors or outdoors. For example, when a user face is unidentifiable due to dark environments or shadows, an issue may arise authenticating the user face.

Accordingly, a method of generating a facial image of a gradient face has been proposed to solve this issue. The method of generating the facial image of the gradient face includes generating a gradient facial image using an arctan value with respect to a gradient ratio of a horizontal/vertical direction. In the method of generating the facial image of the gradient face, smoothing is performed on an input image for stability in gradient calculation, and a gradient value is calculated using a difference of Gaussian (DoG) operator.

SUMMARY

At least one example embodiment discloses a method of image processing, the method including obtaining blocks of an input image, obtaining orthogonal transform coefficients by performing an orthogonal transform on pixel values in the blocks, and generating a resulting image by normalizing the orthogonal transform coefficients.

The generating of the resulting image generates the resulting image based on the applying.

The method of processing the image may further include applying a weight to the obtained orthogonal transform coefficients.

At least one example embodiment discloses a method of authenticating a user, the method including obtaining orthogonal transform coefficients by performing an orthogonal transform on pixel values of a facial image, generating a resulting image by normalizing the orthogonal transform coefficients, and performing a user authentication based on the resulting image.

The method of authenticating the user may further include applying a weight to the obtained orthogonal transform coefficients, wherein the generating the resulting image generates the resulting image based on the applying.

At least one example embodiment discloses an apparatus for processing an image, the apparatus including a block setter configured to obtain blocks of an input image, an orthogonal transformer configured to obtain orthogonal transform coefficients by performing an orthogonal transform on pixel values in the blocks, and a resulting image generator configured to generate a resulting image by normalizing the orthogonal transform coefficients.

The apparatus for processing the image may further include a user authenticator configured to perform a user authentication based on the resulting image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

Figure 1:
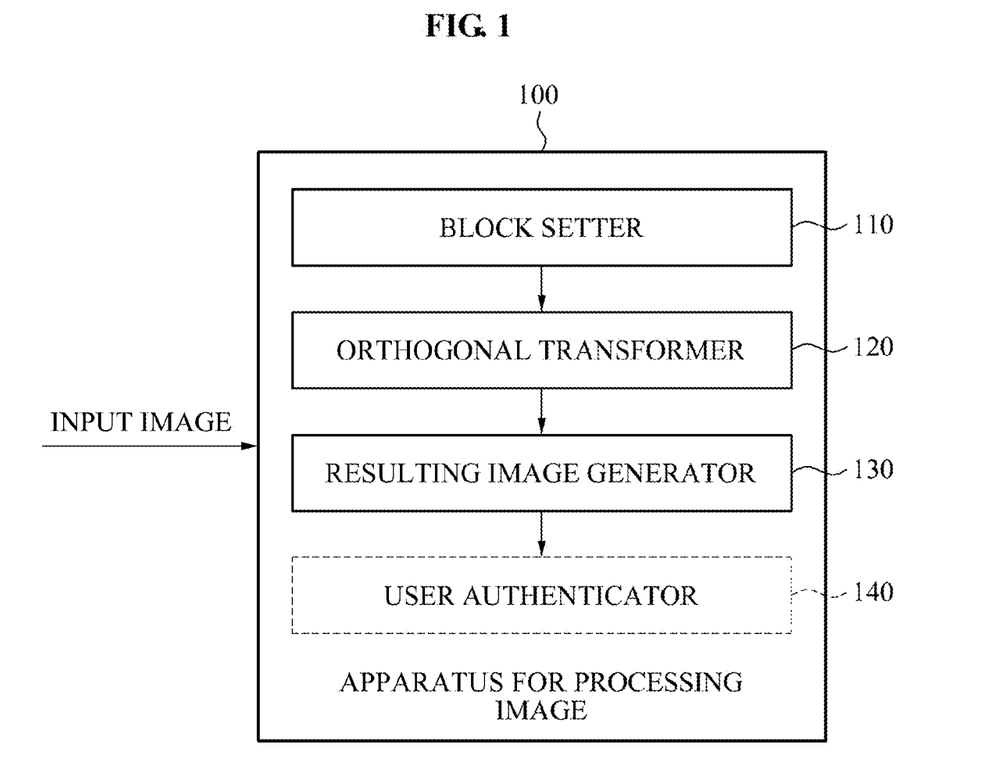
FIG. 1 illustrates a configuration of an apparatus for processing an image according to an example embodiment.

FIG. 1 illustrates a configuration of an apparatus 100 for processing an image according to an example embodiment.

The apparatus 100 for processing the image may generate a resulting image by processing an input image. The apparatus 100 for processing the image may obtain orthogonal transform coefficients by performing an orthogonal transform on the input image. As used herein, "orthogonal transform" refers to a method of decomposing a subject into components to allow the components to be orthogonal to one another. The apparatus 100 for processing the image may generate the resulting image by normalizing the orthogonal transform coefficients. The generated resulting image may consistently represent a structure of an object displayed in the input image irrespective of illumination conditions of the input image. For example, although the input image is dark or includes a structured shadow formed by the structure of the object displayed in the input image, the apparatus 100 for processing the image may generate the resulting image that consistently represents the structure of the object.

Referring to FIG. 1, the apparatus 100 for processing the image includes a block setter 110, an orthogonal transformer 120, and a resulting image generator 130.

The block setter 110, the orthogonal transformer 120, and the resulting image generator 130 may be hardware, firmware, hardware executing software or any combination thereof. When at least one of the block setter 110, the orthogonal transformer 120, and the resulting image generator 130 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the block setter 110, the orthogonal transformer 120, and the resulting image generator 130. CPUs, DSPs, ASICs and FPGAs may generally be referred to as processors and/or microprocessors.

In the event where at least one of the block setter 110, the orthogonal transformer 120, and the resulting image generator 130 is a processor executing software, the processor is configured as a special purpose machine to execute the software, stored in a storage medium, to perform the functions of the at least one of the block setter 110, the orthogonal transformer 120, and the resulting image generator 130. In such an embodiment, the processor may include one or more Central Processing Units (CPUs), digital signal processors (DSPs), application-specific-integrated-circuits (ASICs), field programmable gate arrays (FPGAs) computers.

The block setter 110 may set blocks in the input image. For example, the block setter 110 may set an image block in an N×N size, N being a number of pixels a natural number, with the image block being centered at a current pixel in the input image. Sizes of the blocks to be set in the input image may be predetermined, or adaptively determined based on a size of the input image or a brightness of the input image.

The orthogonal transformer 120 may obtain the orthogonal transform coefficients by performing an orthogonal transform on pixel values of the blocks set in the input image. For example, the orthogonal transformer 120 may obtain the orthogonal transform coefficients of the pixel values of the blocks using at least one of a singular value decomposition (SVD), a discrete cosine transform (DCT), a discrete Fourier transform (DFT), a Hadamard Transform, a fast Fourier transform (FFT), a wavelet transform (WT), a Hartley transform, a Karhunen-Loeve transform (KLT), a slant transform, and a Haar transform.

The resulting image generator 130 may generate the resulting image based on a result of normalizing the orthogonal transform coefficients. For example, the resulting image generator 130 may generate the resulting image by converting the result of normalizing of the orthogonal transform coefficients into a pixel value in a predetermined and/or selected range.

In one example, the resulting image generator 130 may generate the resulting image based on a ratio of a sum of the orthogonal transform coefficients obtained with respect to the blocks to any of the orthogonal transform coefficients. The resulting image generator 130 may calculate a ratio value of the sum of the orthogonal transform coefficients obtained with respect to the blocks to any of the orthogonal transform coefficients, and determine the calculated ratio value to be a center pixel value of blocks in the resulting image corresponding to the blocks in the input image. For example, the resulting image generator 130 may generate the resulting image based on a ratio of the sum of the orthogonal transform coefficients obtained with respect to the blocks to a greatest value among the orthogonal transform coefficients.

In another example, the resulting image generator 130 may generate the resulting image using the sum of the orthogonal transform coefficients obtained with respect to the blocks, and a difference between the obtained orthogonal transform coefficients. For example, the resulting image generator 130 may generate the resulting image based on a ratio of a difference between two orthogonal transform coefficients to the sum of the orthogonal transform coefficients obtained with respect to the blocks.

The resulting image generator 130 may generate the resulting image by combining ratio values deduced with respect to all the blocks set in the input image. A process in which the resulting image generator 130 generates a resulting image will be described in greater detail with reference to FIG. 2.

According to at least one example embodiment, the resulting image generator 130 may apply a weight to the orthogonal transform coefficients obtained by the orthogonal transformer 120. As used herein, the "weight" may be a predetermined value, or determined based on at least one of the size of the input image, the sizes of the blocks set in the input image, and the brightness of the input image. A degree to which a texture of the input image is reflected in the resulting image may be determined based on a magnitude of the weight. For example, the greater the magnitude of the weight, the greater degree the texture of the input image to be reflected in the resulting image. The resulting image generator 130 may maintain a structure of the texture of the input image by adjusting the magnitude of the weight. The resulting image generator 130 may generate the resulting image by normalizing the orthogonal transform coefficients to which the weight is applied.

According to example embodiments, the apparatus 100 for processing the image may further include a user authenticator 140.

An example of the input image may include a facial image of a user. The user authenticator 140 may perform a user authentication based on the resulting image generated from the facial image. The user authenticator 140 may perform the user authentication based on the resulting image generated from the facial image and pre-stored reference images. The user authenticator 140 may perform the user authentication based on a similarity between the pre-stored reference images and the resulting image. The user authenticator 140 may perform the user authentication by comparing the pre-stored reference images and the resulting image in a pixel unit using various similarity metrics. For example, the user authenticator 140 may calculate similarities between a landmark, such as an eye, a nose, a corner of a mouth, or an eyebrow, and a landmark included in the resulting image, and determine whether a result of combining the calculated similarities satisfies predetermined and/or selected conditions to perform the user authentication.

Figure 2:
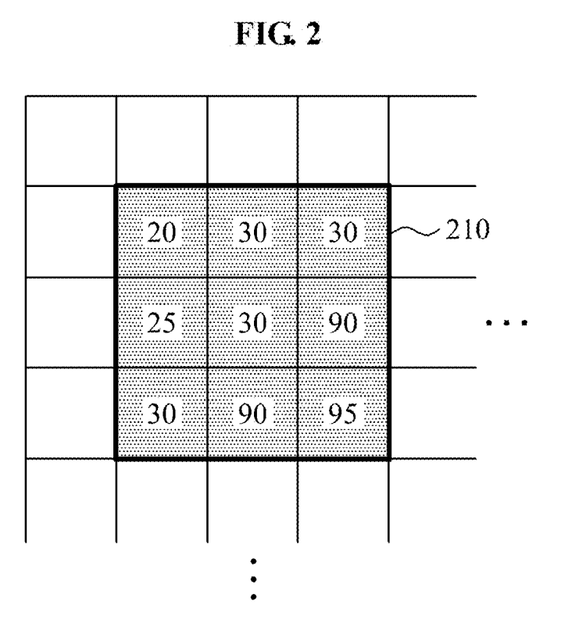
FIG. 2 illustrates a process in which an apparatus for processing an image generates a resulting image according to an example embodiment.

FIG. 2 illustrates a process in which the apparatus 100 for processing the image generates a resulting image according to an example embodiment.

Referring to FIG. 2, a method in which the apparatus 100 for processing the image generates the resulting image using an orthogonal transform, for example, an SVD, will be described. However, it should be understood that an orthogonal transform other than SVD may be used.

As an example, the block setter 110 may set a block 210, having a size of 3 pixels×3 pixels in an input image. Moreover, each pixel has a corresponding pixel value (e.g., 20, 30, 30, 25, 30, 90, 30, 90 and 95). The orthogonal transformer 120 may obtain three singular values by applying the SVD to the set block 210. The three singular values are denoted by $\lambda_1$, $\lambda_2$, and $\lambda_3$.

The resulting image generator 130 may perform normalization based on Equation 1.

$$\hat{p}_i = \frac{c}{\sum_{j=1}^{N} \lambda_j}, \text{ where } c \in \{\lambda_1, \lambda_2, \dots, \lambda_N\}, \quad \text{[Equation 1]}$$

In Equation 1, $\hat{p}_i$ denotes a normalized orthogonal transform coefficient value as a result of normalizing the singular values, and i denotes an index of a pixel in a resulting image. $\lambda_j$ denotes an orthogonal transform coefficient calculated with respect to a block, and j denotes an index of an orthogonal transform coefficient.

When Equation 1 is applied to the three singular values $\lambda_1$, $\lambda_2$, and $\lambda_3$, Equation 2 may be obtained.

$$\hat{p}_i = \frac{c}{\sum_{j=1}^{N} \lambda_j} = \frac{\lambda_1}{\lambda_1 + \lambda_2 + \lambda_3} \quad \text{[Equation 2]}$$

In Equation 2, $\lambda_1$, for example, a main energy, is used as an example of a "c" value. The resulting image generator 130 may generate a resulting image based on $\hat{p}_i$ calculated for a plurality of blocks.

According to example embodiments, the resulting image generator 130 may use a difference between orthogonal transform coefficients as the "c" value. For example, the resulting image generator 130 may use a difference between $\lambda_1$ and $\lambda_2$, or a difference between $\lambda_2$ and $\lambda_3$ as the "c" value. When an input image includes a complex texture structure, sizes of the orthogonal transform coefficients may be similar, and the resulting image generator 130 may determine a pixel value in a resulting image based on the difference between the orthogonal transform coefficients. The difference between the orthogonal transform coefficients may indicate a contrast value attribute.

According to example embodiments, the resulting image generator 130 may apply a weight to the orthogonal transform coefficients obtained by the orthogonal transformer 120 as represented by Equation 3.

$$\lambda_i = \lambda_i + \tau \quad \text{[Equation 3]}$$

In Equation 3, $\tau$ denotes a weight to be applied to an orthogonal transform coefficient, $\lambda_i$ denotes an orthogonal transform coefficient, and i denotes an index of an orthogonal transform coefficient.

Here, τ may be a fixed value or be adaptively determined for each input image. The greater a value of τ, the greater a degree to which a texture of the input image is reflected in a resulting image. The resulting image generator 130 may normalize the orthogonal transform coefficient to which τ is applied, and based on the normalized orthogonal transform coefficient, generate the resulting image in which the texture of the input image is reflected.

A normalized value of the orthogonal transform coefficient obtained through the orthogonal transform may not be affected by changes in illumination conditions. The apparatus 100 for processing the image may generate a resulting image in which a current pixel is robust against various illumination conditions irrespective of a type of shadow areas through the orthogonal transform and normalization.

Hereinafter, descriptions pertaining to the normalized value of the orthogonal transform coefficient being robust against changes in illumination will be provided with reference to equations. By way of example, a physical model with respect to an illumination may be used to describe the normalized value of the orthogonal transform coefficient being robust against changes in illumination.

In general, a pixel value in an input image is calculated by multiplying an illumination component and a reflectance component as shown in Equation 4.

$$P(x,y)=I(x,y)R(x,y) \quad \text{[Equation 4]}$$

Equation 4, $P(x, y)$ denotes a pixel value at a $(x, y)$ position in an input image. $I(x, y)$ denotes an illumination component included in the pixel at the $(x, y)$ position, and $R(x, y)$ denotes a reflectance component included in the pixel at the $(x, y)$ position in the input image.

The illumination component $I(x, y)$ may be divided into an illuminated component, a penumbra component, and an umbra component based on a type of illumination. The illuminated component, the penumbra component, and the umbra component are represented by Equation 5.

$$I(x, y) = \begin{cases} c_a + c_p\cos(\varphi), \\ c_a + tc_p\cos(\varphi), \\ c_a, \end{cases} \quad \text{[Equation 5]}$$

$C_a$ denotes an intensity of an ambient light, and $C_p$ denotes an intensity of a light source. $\varphi$ denotes an incident angle between a light source and a surface normal, and t denotes a transition in a penumbra area. In Equation 5, the illuminated component is denoted by $c_a+c_p \cos(\varphi)$, the penumbra component is denoted by $c_a+tc_p \cos(\varphi)$, and the umbra component is $C_a$.

When blocks in sizes of N×N pixels are present in illumination areas, an illuminated area, a penumbra area, and an umbra area, are assumed to be $B_i$, $B_p$, and $B_u$, respectively, for example. Equation 6 may be obtained based on Equation 5.

$$B_p = K_1 B_i, \quad B_u = K_2 B_i, \quad \text{[Equation 6]}$$

where $$K_1 = \frac{c_a + tc_p\cos(\varphi)}{c_a + c_p\cos(\varphi)} \text{ and } K_2 = \frac{c_a}{c_a + c_p\cos(\varphi)}$$

When an orthogonal transform is performed for each block, Equation 7 may be obtained.

$$B_k = U_k S_k V_k^T \rightarrow S_k = U_k^T B_k V_k, \ k \in \{i,p,u\} \quad \text{[Equation 7]}$$

In Equation 7, U and V each denote an orthogonal matrix. When an orthogonal matrix is multiplied by a transpose matrix, an identity matrix may be obtained. A matrix S including an orthogonal transform coefficient may be obtained from a block for each of the illuminated area, the penumbra area, and the umbra area.

The matrix S in each area may be represented by Equation 8 based on Equation 6.

$$S_p = U_i^T K_1 B_i V_i = K_1 S_i,$$

$$S_u = U_i^T K_2 B_i V_i = K_2 S_i, \quad \text{[Equation 8]}$$

In Equation 8, $K_1$ and $K_2$ each denote a constant defined in Equation 6, and S in each matrix includes an orthogonal transform coefficient $\lambda_i$. A matrix $S_p$ is a matrix including an orthogonal transform coefficient of a block present in the penumbra area, and $S_u$ is a matrix including an orthogonal transform coefficient of a block present in the umbra area. Equation 8 is deduced from "$U_p=U_i=U_u$, $V_p=V_i=V_u$," indicating that orthogonal matrices of input images are identical to one another despite differing illumination conditions when the input images are captured.

When a size of a set block is 3×3, the matrix S may be expressed by Equation 9.

$$S = \begin{bmatrix} \lambda_1 & 0 & 0 \\ 0 & \lambda_2 & 0 \\ 0 & 0 & \lambda_3 \end{bmatrix} \quad \text{[Equation 9]}$$

In the three illumination areas, for example, the illuminated area, the penumbra area, and the umbra area, a normalized value of an orthogonal transform coefficient for each of the illumination areas may be represented by Equation 10.

$$\frac{\lambda_1}{\lambda_1+\lambda_2+\lambda_3} = \frac{K_1\lambda_1}{K_1(\lambda_1+\lambda_2+\lambda_3)} = \frac{K_2\lambda_1}{K_2(\lambda_1+\lambda_2+\lambda_3)} \quad \text{[Equation 10]}$$

In Equation 10, $K_1$ and $K_2$ are constants and thus, normalized orthogonal transform coefficient values in the three illumination areas may be identical to one another. Accordingly, a structure of an object displayed in an input image may be consistently represented irrespective of illumination conditions and illumination changes using the normalized value of the orthogonal transform coefficients.

Figure 3:
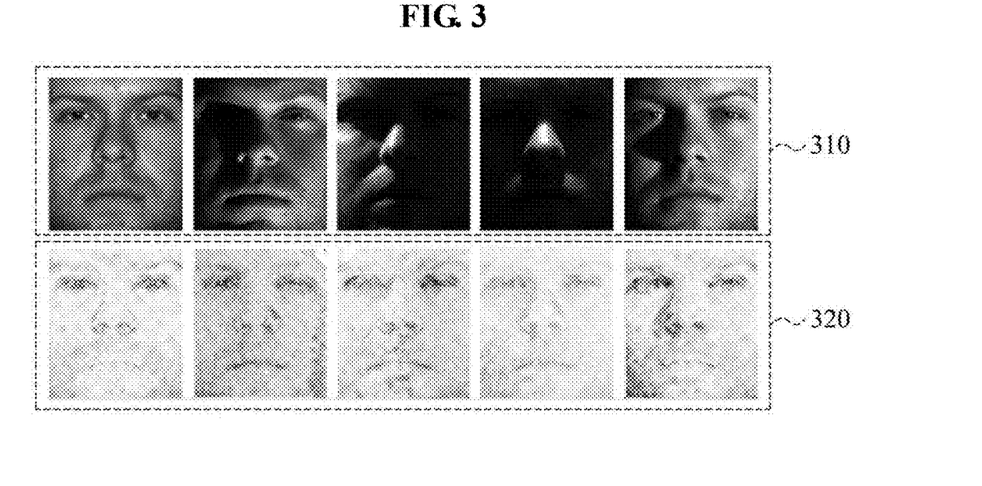
FIG. 3 illustrates an example of resulting images with respect to various input images according to an example embodiment.

FIG. 3 illustrates an example of resulting images with respect to various input images according to an example embodiment.

Referring to FIG. 3, an image 310 represents a plurality of input images of a facial image captured in various illumination conditions. For example, the image 310 may include a facial image captured in a bright condition, a facial image captured in a dark condition, and a facial image obscured by a shadow due to a facial structure.

An image 320 may represent a plurality of resulting images obtained as a result of the image 310 being processed by an apparatus for processing an image. For example, the image 320 represents an image obtained by converting a normalized orthogonal transform coefficient value calculated based on Equation 1 to a grey scale in a range of [0, 255]. The resulting images generated by the apparatus for processing the image may consistently represent a facial structure irrespective of illumination changes. As shown in FIG. 3, shadows around eyes or shadows around a nose displayed in the image 310 are removed in the image 320. Accordingly, the image 320 consistently represents the facial structure of a user irrespective of illumination conditions.

Figure 4:
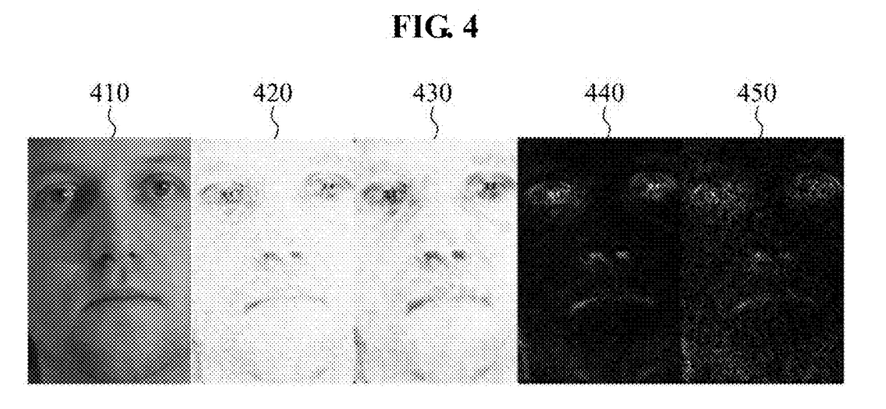
FIG. 4 illustrates an example of resulting images to which differing conditions are applied according to an example embodiment.

FIG. 4 illustrates an example of resulting images to which differing conditions are applied according to an example embodiment.

Referring to FIG. 4, an image 410 represents an input image. Images 420 through 450 represent an example of resulting images obtained based on the image 410. For example, the image 420 may be a resulting image when a size of a block set in the input image is 3×3 and c is set to be a greatest, for example, $\lambda_1$, from among orthogonal transform coefficients in Equation 1. The image 430 may be a resulting image when a size of a block is set to be 5×5, and c is set to be $\lambda_1$ in Equation 1. The image 440 may be a resulting image when a size of a block image is set to be 3×3, and c is set to be a second greatest, for example, $\lambda_2$, from among the orthogonal transform coefficients in Equation 1. The image 450 may be a resulting image when a size of a block is set to be 5×5, and c is set to be $\lambda_2$ in Equation 1.

Figure 5:
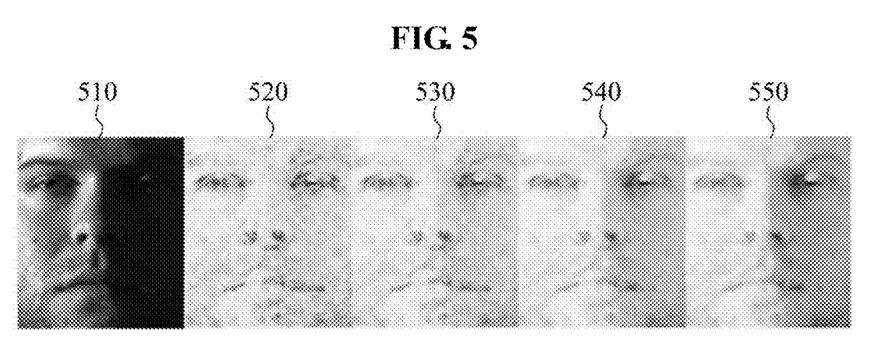
FIG. 5 illustrates an example of resulting images based on a magnitude of a weight according to an example embodiment.

FIG. 5 illustrates an example of resulting images based on a magnitude of a weight according to an example embodiment.

An apparatus for processing an image may reflect a texture structure of an input image in a resulting image by adjusting a magnitude of a weight. For example, the apparatus for processing the image may reflect the texture structure of the input image in the resulting image by applying a weight to an orthogonal transform coefficient as shown in Equation 3. The apparatus for processing the image may reflect the texture structure of the input image in the resulting image to a greater degree by setting the magnitude of the weight to be greater.

Referring to FIG. 5, an example of an input image 510 and resulting images 520 through 550 are illustrated. For example, the resulting image 520 is a resulting image when a weight is not applied, for example, when τ is set to zero in Equation 3. The resulting image 530 is a resulting image when τ is set to "0.5" in Equation 3, and the resulting image 540 is a resulting image when τ is set to "1.0" in Equation 3. The resulting image 550 is a resulting image when τ is set to "5.0" in Equation 3. When the resulting images 520 through 550 are compared with one another, the greater the magnitude of the weight τ, the greater a degree to which the texture structure of the input image is reflected in the resulting image.

Figure 6:
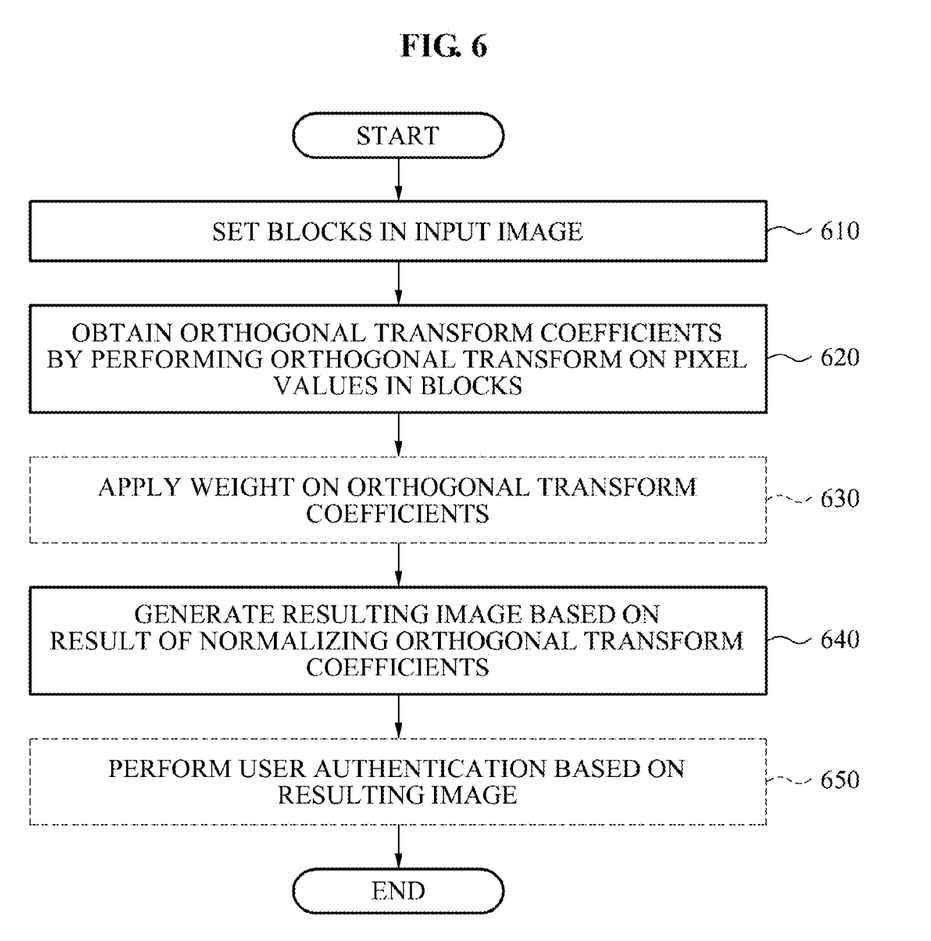
FIG. 6 illustrates an operation of a method of processing an image according to an example embodiment.

FIG. 6 illustrates an operation of a method of processing an image according to an example embodiment.

In operation 610, an apparatus for processing an image may set blocks in an input image. Sizes of the blocks set in the input image may be predetermined, or adaptively determined based on a size of the input image or a brightness of the input image.

In operation 620, the apparatus for processing the image may obtain orthogonal transform coefficients by performing an orthogonal transform on pixel values in the blocks. For example, the apparatus for processing the image may obtain the orthogonal transform coefficients of the pixel values in the blocks using at least one of an SVD, a DCT, a DFT, a Hadamard Transform, an FFT, a WT, a Hartley transform, a KLT, a slant transform, and a Haar transform.

According to an example embodiment, the apparatus for processing the image may further perform operation 630 prior to performing operation 640. In operation 630, the apparatus for processing the image may apply a weight to the orthogonal transform coefficients obtained from operation 620. The weight may be a predetermined value, or a magnitude of the weight may be adaptively determined based on at least one of the size of the input image, the sizes of the blocks set in the input image, a distribution of shadows in the input image, and the brightness of the input image. A degree to which a texture of the input image is reflected in the resulting image may be determined based on the magnitude of the weight.

In operation 640, the apparatus for processing the image may normalize the orthogonal transform coefficients, and generate the resulting image based on a result of normalizing. The apparatus for processing the image may generate the resulting image by converting the result of normalizing of the orthogonal transform coefficients to a pixel value in a predetermined and/or selected range. In one example, the apparatus for processing the image may generate the resulting image based on a ratio of a sum of the orthogonal transform coefficients obtained with respect to the blocks to any of the orthogonal transform coefficients. In another example, the apparatus for processing the image may generate the resulting image using the sum of the orthogonal transform coefficients obtained with respect to the blocks and a difference between the obtained orthogonal transform coefficients. By way of example, the apparatus for processing the image may generate the resulting image based on a ratio of a difference between two orthogonal transform coefficients to the sum of the orthogonal transform coefficients obtained with respect to the blocks. The apparatus for processing the image may generate the resulting image by combining ratio values obtained with respect to all of the blocks set in the input image.

Subsequent to performing operation 630, the apparatus for processing the image may generate the resulting image by normalizing the orthogonal transform coefficients to which the weight is applied.

According to an example embodiment, the apparatus for processing the image may selectively perform operation 650. In operation 650, the apparatus for processing the image may perform a user authentication based on the resulting image. An example of the input image may include a facial image of a user. The apparatus for processing the image may perform the user authentication based on the resulting image generated from the facial image. The apparatus for processing the image may perform the user authentication based on a similarity between pre-stored reference images and the resulting image. The apparatus for processing the image may calculate similarities between the resulting image and the reference images, and based on whether the similarities satisfy predetermined and/or selected conditions, may perform the user authentication.

The above-described example embodiments may be recorded in non-transitory computer-readable media including program instructions to implement various operations embodied by a computer. The term "computer-readable media", "storage medium", "computer readable storage medium" or "non-transitory computer readable storage medium" may represent one or more devices for storing data. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of image processing, the method comprising:
obtaining blocks of an input image by dividing the input image into the blocks;
obtaining orthogonal transform coefficients by performing an orthogonal transform on pixel values in the blocks; and
generating a resulting image by normalizing the orthogonal transform coefficients within the blocks such that normalized orthogonal transform coefficients for an illuminated area, a penumbra area and an umbra area for a same block of the blocks are the same.

2. The method of claim 1, further comprising:
applying a weight to the obtained orthogonal transform coefficients,
wherein the generating of the resulting image generates the resulting image based on the applying.

3. The method of claim 2, wherein the applying the weight comprises:
determining a weight based on at least one of a size of the input image, sizes of the blocks, a distribution of shadows in the input image, and a brightness of the input image; and
applying the determined weight to the obtained orthogonal transform coefficients.

4. The method of claim 1, wherein the generating the resulting image comprises:
generating the resulting image based on a ratio of a sum of the orthogonal transform coefficients to at least one of the orthogonal transform coefficients.

5. The method of claim 1, wherein the generating the resulting image comprises:
generating the resulting image based on a ratio of a sum of the orthogonal transform coefficients to a greatest value among the orthogonal transform coefficients.

6. The method of claim 1, wherein the obtaining the orthogonal transform coefficients comprises:
obtaining the orthogonal transform coefficients of the pixel values in the blocks using at least one of a singular value decomposition (SVD), a discrete cosine transform (DCT), a discrete Fourier transform (DFT), a Hadamard Transform, a fast Fourier transform (FFT), a wavelet transform (WT), a Hartley transform, a Karhunen-Loeve transform (KLT), a slant transform, and a Haar transform.

7. A non-transitory computer-readable medium, when executed on a computer, configured to instruct the computer to perform the method of claim 1.

8. The method of claim 1, further comprising:
applying a weight to the obtained orthogonal transform coefficients, wherein the generating generates the resulting image by normalizing the weighted orthogonal transform coefficients.

9. A method of image processing, the method comprising:
obtaining blocks of an input image by dividing the input image into the blocks;
obtaining orthogonal transform coefficients by performing an orthogonal transform on pixel values in the blocks;
applying a weight to the obtained orthogonal transform coefficients;
generating a resulting image by normalizing the weighted orthogonal transform coefficients within the blocks and based on the applying; and
determining a degree to which a texture of the input image is reflected in the resulting image based on a magnitude of the weight.

10. A method of image processing, the method comprising:
obtaining blocks of an input image by dividing the input image into the blocks;
obtaining orthogonal transform coefficients by performing an orthogonal transform on pixel values in the blocks; and
generating a resulting image by normalizing the orthogonal transform coefficients within the blocks, wherein the generating the resulting image includes,
generating the resulting image based on a ratio of a difference between the obtained orthogonal transform coefficients to a sum of the orthogonal transform coefficients.

11. A method of authenticating a user, the method comprising:
obtaining orthogonal transform coefficients by performing an orthogonal transform on pixel values of a facial image by dividing the facial image into the blocks;
generating a resulting image by normalizing the orthogonal transform coefficients within the blocks such that normalized orthogonal transform coefficients for an illuminated area, a penumbra area and an umbra area for a same block of the blocks are the same; and
performing a user authentication based on the resulting image.

12. The method of claim 11, further comprising:
applying a weight to the obtained orthogonal transform coefficients,
wherein the generating the resulting image generates the resulting image based on the applying.

13. The method of claim 11, wherein the generating the resulting image comprises:
determining pixel values of the resulting image based on a ratio of a sum of the orthogonal transform coefficients to at least one of the orthogonal transform coefficients.

14. The method of claim 11, wherein the performing the user authentication comprises:
performing the user authentication based on a similarity between stored reference images and the resulting image.

15. A non-transitory computer-readable medium, when executed on a computer, configured to instruct the computer to perform the method of claim 11.

16. An apparatus for processing an image, the apparatus comprising:
a memory having instructions stored thereon; and
at least one processor configured to execute the instructions such that the at least one processor is configured to,
obtain blocks of an input image by dividing the input image into the blocks,
obtain orthogonal transform coefficients by performing an orthogonal transform on pixel values in the blocks, and
generate a resulting image by normalizing the orthogonal transform coefficients within the blocks such that normalized orthogonal transform coefficients for an illuminated area, a penumbra area and an umbra area for a same block of the blocks are the same.

17. The apparatus of claim 16, the at least one processor is configured to,
apply a weight to the obtained orthogonal transform coefficients, and
generate the resulting image based on the weighted obtained orthogonal transform coefficients.

18. The apparatus of claim 17, wherein the at least one processor is configured to determine the weight based on at least one of a size of the input image, sizes of the blocks, and a brightness of the input image.

19. The apparatus of claim 16, wherein the at least one processor is configured to generate the resulting image based on a ratio of a sum of the orthogonal transform coefficients obtained to at least one of the orthogonal transform coefficients.

20. The apparatus of claim 16, wherein the input image is a facial image of a user, and the at least one processor is configured to,
perform a user authentication based on the resulting image and the input image.

* * * * *